(12) United States Patent
Srivastava et al.

(10) Patent No.: US 12,332,873 B2
(45) Date of Patent: Jun. 17, 2025

(54) MULTIMODAL RETRIEVAL AND EXECUTION MONITORING USING RICH RECIPE REPRESENTATION

(71) Applicant: UNIVERSITY OF SOUTH CAROLINA, Columbia, SC (US)

(72) Inventors: Biplav Srivastava, Chapin, SC (US); Vishal Pallagani, Columbia, SC (US); Revathy Chandrasekaran Venka, Columbia, SC (US); Vedant Khandelwal, Columbia, SC (US); Kausik Lakkaraju, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 0 days.

(21) Appl. No.: 18/455,730

(22) Filed: Aug. 25, 2023

(65) Prior Publication Data

US 2024/0086394 A1 Mar. 14, 2024

Related U.S. Application Data

(60) Provisional application No. 63/406,073, filed on Sep. 13, 2022.

(51) Int. Cl.
*G06F 16/23* (2019.01)
*G06F 16/2453* (2019.01)
*G06F 16/2457* (2019.01)

(52) U.S. Cl.
CPC ...... *G06F 16/2365* (2019.01); *G06F 16/2453* (2019.01); *G06F 16/2457* (2019.01)

(58) Field of Classification Search
CPC ............. G06F 16/2365; G06F 16/2453; G06F 16/2457; G06F 16/9035
See application file for complete search history.

(56) References Cited

U.S. PATENT DOCUMENTS

| | | | |
|---|---|---|---|
| 9,311,568 B1 * | 4/2016 | Feller | G06V 20/62 |
| 10,952,670 B2 | 3/2021 | Mori et al. | |
| 11,048,939 B2 | 6/2021 | Lu et al. | |
| 11,080,775 B2 | 8/2021 | Alkan et al. | |

(Continued)

OTHER PUBLICATIONS

Batra et al. "RecipeDB: A resource for exploring recipes," Database 2020 (2020).

(Continued)

*Primary Examiner* — Angelica Ruiz
(74) *Attorney, Agent, or Firm* — DORITY & MANNING, P.A.

(57) ABSTRACT

The disclosure deals with a system and method for improved representation and retrieval of recipes or workflows. Recipes or workflows such as for preparing food or assembling furniture or performing other complex activities exist as textual or image documents, which makes it difficult for machines to read, reason, and handle ambiguity. The present disclosure provides a Rich Recipe Representation ("R3"), which is enhanced with additional knowledge such as outcomes like allergen information, possible failures, and solutions for each atomic step (such as a cooking step). The disclosed R3 is used in a web-based decision support system that helps users perform constrained queries using multiple modalities while also monitoring execution of an agent cooking or otherwise acting based on it.

26 Claims, 3 Drawing Sheets

(56) References Cited

U.S. PATENT DOCUMENTS

| | | | | |
|---|---|---|---|---|
| 11,232,259 | B1* | 1/2022 | Neumann | G06F 16/9035 |
| 2012/0096463 | A1* | 4/2012 | Agarwal | G06Q 10/0633 |
| | | | | 718/100 |
| 2014/0019312 | A1* | 1/2014 | Renz | G06Q 10/10 |
| | | | | 705/28 |
| 2015/0363492 | A1* | 12/2015 | Laredo | G06F 9/54 |
| | | | | 707/770 |
| 2020/0365053 | A1* | 11/2020 | Pichara | G01N 33/12 |
| 2023/0214735 | A1* | 7/2023 | Garcia-Brosa | G06Q 10/0833 |
| | | | | 705/7.13 |

OTHER PUBLICATIONS

Lien et al. "Recipe Retrieval with Visual Query of Ingredients" Proceedings of the 43rd International ACM SIGIR Conference on Research and Development in Information Retrieval, (2020) pp. 1565-1568.

Ninomiya et al. "Learning distributed representation of recipe flow graphs via frequent subgraphs", in Proceedings of the 11th Workshop on Multimedia for Cooking and Eating Activities, (2019) pp. 25-28.

Park et al. "AI Allergy: Machine learning allergen detection" Devpost https://devpost.com/software/ai-allergy#updates.

Shirai et al. "Identifying Ingredient Substitutions Using a Knowledge Graph of Food", Frontiers in Artificial Intelligence (2021) p. 111.

* cited by examiner

| | |
|---|---|
| Recipe | R = {IG, I, prep_time, cook_time, serves} |
| Ingredients | IG = {name, Q, A, alternative, quality_characteristic, image} |
| Quantity | Q = {measure, unit} |
| Allergen | A = {ID, category, ref, details} |
| Instructions | I = {original_text, input_condition, T, output_condition, M} |
| Tasks | T = {action_name, activity, objects, output_quality, BK} |
| Modality | M = {image, video, text} |
| Background Knowledge | BK = {tool, failure} |

FIG. 2

```json
"recipe-ids": {
    "0":
    {
        "recipe_name": "",
        "ingredients": [
            {
                "name": "",
                "quantity": {
                    "measure": "",
                    "unit": ""
                },
                "allergies": {
                    "id": "",
                    "category": "",
                    "ref": "",
                    "details": ""
                },
                "alternative": "",
                "quality_characteristic": "",
                "image": ""
            }
        ],
        "prep_time": "",
        "cook_time": "",
        "serves": "",
        "instructions": [
            {
                "original_text": "",
                "input_condition": [""],
                "task": [
                    {
                        "action_name": "",
                        "activity": "",
                        "objects": "",
                        "output_quality": [""],
                        "background_knowledge": {
                            "tool": [""],
                            "failure": [""]
                        }
                    }
                ],
                "output_condition": [""],
                "modality": {
                    "image": ["",""],
                    "video": " "
                }
            }
        ]
    }
}
```

FIG. 3

MULTIMODAL RETRIEVAL AND EXECUTION MONITORING USING RICH RECIPE REPRESENTATION

PRIORITY CLAIM

The present application claims the benefit of priority of U.S. Provisional Patent Application No. 63/406,073, titled Multimodal Retrieval And Execution Monitoring Using Rich Recipe Representation, filed Sep. 13, 2023, and which is fully incorporated herein by reference for all purposes.

BACKGROUND OF THE PRESENTLY DISCLOSED SUBJECT MATTER

This disclosure deals with a system and method for multimodal recipe retrieval and execution monitoring using a rich recipe representation.

Food is not only a basic human necessity but also a key factor driving a society's health and economic well-being. As cooking is becoming a popular domain to enable precision health, the need to build and deploy decision-support tools (i.e., AI) has been on the rise. However, it is important that the AI understands the concepts in the food domain (e.g., recipes, ingredients), is tolerant to failures encountered while cooking (e.g., browning of butter), handles allergy-based substitutions, and understands the relevance between multiple data modalities. The content of recipes for preparing food or for assembling furniture or other complex tasks exists as textual or image documents which makes it difficult for machines to read, reason, and handle ambiguity.

Moreover, the recipes available on the internet or in cookbooks presume that the reader already has some acquired some cooking knowledge, and thus, do not explicitly mention the common steps learned while cooking. For example, a human cook would interpret the instruction "Squeeze a lemon into the marinade" as "Cut the lemon into two halves→Remove the seeds→Squeeze each half into the marinade." However, a system would not be able to come up with this sequence of actions unless there is a richer representation of recipe data.

Users need help with discovery and achievement of food goals, for example, how to address specific questions:
- How to search recipes based on one or more types of inputs and outputs: e.g., text, image?
- How to search when limited by availability of ingredients or presence of allergens?
- How to prepare food?
- How to recover when one makes a mistake during cooking?

Some prior art describes systems and methods relating to addressing recipes, including, for example, Shirai, Sola S., Oshani Seneviratne, Minor E. Gordon, Ching-Hua Chen, and Deborah L. McGuinness, "Identifying ingredient substitutions using a knowledge graph of food", *Frontiers in Artificial Intelligence* (2021) page 111; Akari Ninomiya and Tomonobu Ozaki, Learning distributed representation of recipe flow graphs via frequent subgraphs, in *Proceedings of the 11th Workshop on Multimedia for Cooking and Eating Activities*, (2019) pages 25-28; Yen-Chieh Lien, Hamed Zamani, and W. Bruce Croft, Recipe retrieval with visual query of ingredients, in *Proceedings of the 43rd International ACM SIGIR Conference on Research and Development in Information Retrieval*, (2020) pages 1565-1568; Batra, Devansh, Nirav Diwan, Utkarsh Upadhyay, Jushaan Singh Kalra, Tript Sharma, Aman Kumar Sharma, Dheeraj Khanna et al. "Reciped: A resource for exploring recipes," *Database* 2020 (2020); and Online app Link—https://devpost.com/software/ai-allergy#updates. Also, some US Patents involve recipe and/or food-related subject matter, such as U.S. Pat. Nos. 11,232,259; 11,080,775; 11,048,939; and 10,952,670.

Broadly speaking, the presently disclosed system and method subject matter aids in helping machines understand recipes, which can be useful, for example, with improved searching and monitoring and otherwise.

SUMMARY OF THE PRESENTLY DISCLOSED SUBJECT MATTER

The presently disclosed subject matter, in part, provides a form of recipe representation to address shortcomings due to the fact that recipes exist as textual documents, which make it difficult for machines to read, reason, and handle ambiguity.

The presently disclosed subject matter overcomes above-referenced shortcomings, in part, through presently disclosed recipe representation enhanced with additional knowledge such as outcomes like potential allergies, possible failures, and solutions for each atomic cooking step. The presently disclosed representation can be used in a web-based decision support system that helps users perform constrained queries (e.g., Give me the recipe for a vegan omelet) using multiple modalities. Presently disclosed subject matter also helps monitor execution of an agent cooking a recipe per the presently disclosed form of representation.

The present disclosure concerns a system and method to accomplish referenced features based on the novel rich recipe representation disclosed herewith. Presently disclosed subject matter discloses how to use such representation for both recipe searching and for monitoring cooking efforts based on such a recipe.

Recipes, also referred to as workflows, help people accomplish tasks such as preparing food, assembling furniture, and performing complex activities. Presently disclosed subject matter helps machines understand recipes, which can be used to improve execution-monitoring and initial searching (which is a multibillion-dollar annual industry).

The disclosed embodiment can apply to other industries like manufacturing, education, and hospitality, and generally in each industry to help improve search quality and workflow execution monitoring.

While the presently disclosed subject matter generally involves the field of electrical technology, particular aspects may relate to recipes, recipe searches and recommendation, workflow executions, multimodal representations, and other subjects.

Broadly speaking, some aspects of presently disclosed subject matter relates to a Rich Recipe Representation (R3). In some embodiments, R3 may comprise a machine processable JavaScript® Object Notation (JSON) representation, which unifies information about an object (e.g., ingredient, action, recipe) across multiple modes, such as text, image, and/or video.

In some instances, to maintain provenance, each instruction in R3 is optionally traceable back to the external recipes from which it was built. Generally speaking, each instruction is made up of one or more tasks, each of which is made of atomic actions.

Further, each ingredient may be connected to allergen information and alternatives, and each action may have failure conditions for input and output. In some embodiments, this results in the ability to perform expressive and constrained queries about the outcome of the recipe and the process of recipe preparation.

Still further, some aspects may contribute to the ability to monitor progress of an executor automatically following the instruction.

In some embodiments, both systems and methods may be provided to find (search) recipes from a repository (or depository). Such recipe locating may include steps such as giving query input as text, image or a combination.

The presently disclosed repository subject matter may maintain information about recipe and ingredients in a unified representation of instructions.

Still further, each instruction recorded in R3 may be represented with one or more atomic actions corresponding to an executable action along with its description in text and images, conditions for successful execution, and a pointer to a knowledge graph of external information.

At times, the query has a constraint on the outcome, examples of which may include where the outcome constraint is about allergens in ingredients or is about the condition of the food prepared, or where the process constraint is about the type of action or the order of actions.

Some embodiments relate to systems and corresponding and/or associated methods to monitor the execution of recipes, including such as representing recipe in R3, and tracking the execution of each instruction and each atomic action based on its condition for success.

In another exemplary embodiment disclosed herewith, a system and method for multimodal recipe retrieval and execution monitoring is described.

It is to be understood that the presently disclosed subject matter equally relates to associated and/or corresponding methodologies. One exemplary such method relates to methodology for multimodal recipe retrieval and execution monitoring, preferably comprising maintaining a database comprising a knowledge graph of external information; maintaining a searchable repository of rich recipe representations, each of which comprise a recipe and associated ingredients in a unified representation of instructions, with each instruction recorded in rich recipe representation with one or more atomic actions corresponding to an executable action, along with its description in text and images, condition for successful execution, and pointer to pertinent data in the knowledge graph of external information; making a recipe query input by a user to the searchable repository in the form of text, image or a combination thereof; notifying the user of recipe query output obtained from the searchable repository in the form of text, image or a combination thereof; executing the recipe instructions; and monitoring execution of the recipe atomic actions as established by the corresponding conditions retrieved from the recipe query.

Another exemplary such method relates to methodology for multimodal retrieval and execution monitoring for a workflow for a user accomplishing a task, preferably comprising maintaining a database comprising a knowledge graph of external information; maintaining a searchable repository of rich workflow representations, each of which comprise a workflow and associated materials in a unified representation of instructions, with each instruction recorded in rich workflow representation with one or more atomic actions corresponding to an executable action, along with its description in text and images, condition for successful execution, and pointer to pertinent data in the knowledge graph of external information; making a workflow query input by a user to the searchable repository in the form of text, image or a combination thereof; notifying the user of workflow query output obtained from the searchable repository in the form of text, image or a combination thereof; executing the workflow instructions; and monitoring execution of the workflow atomic actions as established by the corresponding conditions retrieved from the workflow query.

In some instances of the foregoing exemplary embodiment, the workflow for a user accomplishing a task may include at least one of a recipe for preparing food, a set of instructions for assembling a product, or a set of instructions for performing complex activities.

Other example aspects of the present disclosure are directed to systems, apparatus, tangible, non-transitory computer-readable media, user interfaces, memory devices, and electronic devices for ultrafast photovoltaic spectroscopy. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to a system for multimodal recipe retrieval and execution monitoring, preferably comprising a database comprising a knowledge graph of external information; a searchable repository of rich recipe representations, each of which comprise a recipe and associated ingredients in a unified representation of instructions, with each instruction recorded in rich recipe representation with one or more atomic actions corresponding to an executable action, along with its description in text and images, condition for successful execution, and pointer to pertinent data in the knowledge graph of external information; and one or more processors. Such one or more processors are preferably programmed for making a recipe query input by a user to the searchable repository in the form of text, image or a combination thereof; notifying the user of recipe query output obtained from the searchable repository in the form of text, image or a combination thereof; and monitoring execution of the recipe atomic actions by a user as established by the corresponding conditions retrieved from the recipe query.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 2 is a chart relating to an exemplary embodiment of presently disclosed subject matter showing a summary of an exemplary recipe representation in set notation; and FIG. 3 is an illustration of an exemplary recipe in presently disclosed Rich Recipe Representation ("R3").

Figure 1:
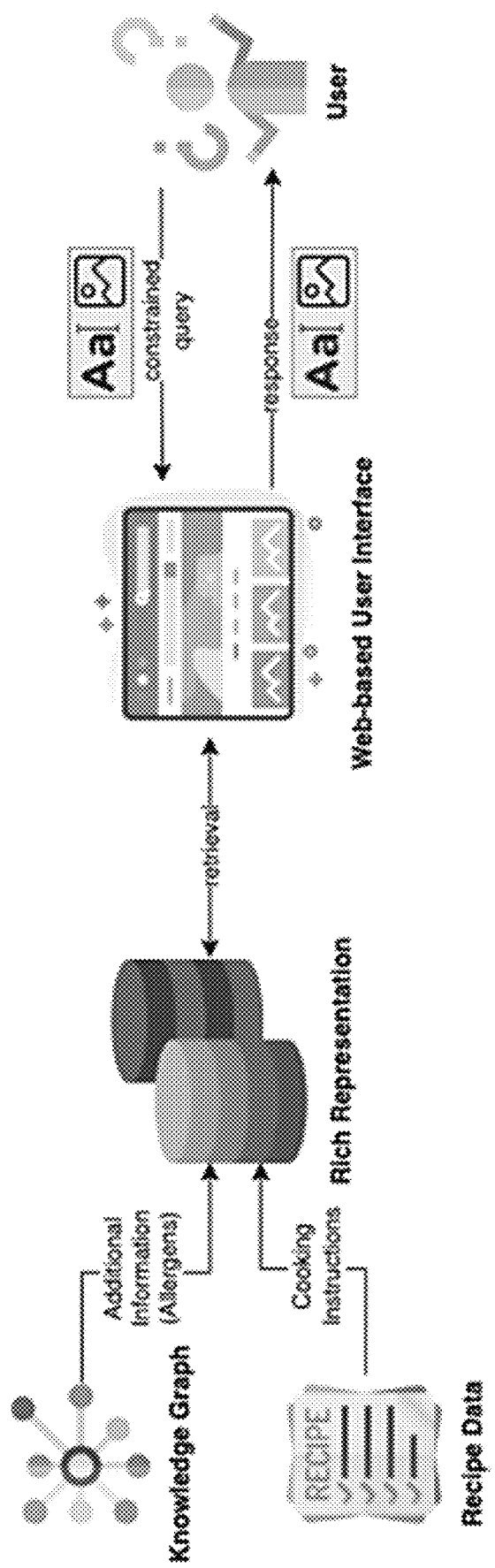
FIG. 1 is a schematic representation of presently disclosed system architecture, representing both presently disclosed system subject matter and methodology.

Repeat use of reference characters in the present specification and drawings is intended to represent the same or analogous features or elements of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a system and/or method which represents a recipe (set of instructions or flowchart) in presently disclosed R3 presentation, and allows for tracking of execution of each instruction and each atomic action based on its condition for success.

As described herein, one particular aspect of presently disclosed subject matter in some instances comprises use of a novel, rich representation, designated herein as "Rich Recipe Representation" (R3). R3, as used herein, refers to a machine processable JSON representation. As understood by those of ordinary skill in the art, JSON or JavaScript® Object Notation is an open standard, human-readable text-based format for representing structured data such as to be transferred. The format is derived from JavaScript® object syntax.

The R3 subject matter as utilized herein has a representation which unifies information about an object (i.e., ingredient, action, recipe) across a plurality of modes: such as text, image, or video.

As shown herein, each instruction is made up of one or more tasks, each of which is made of atomic actions. Similarly, each ingredient is connected to allergen information and alternative ingredients. Also, each action has an accompanying failure condition for input and output.

The resulting subject matter disclosed herewith has the ability to perform expressive and constrained queries about the outcome of recipe and/or the process of recipe preparation. Further, it has the ability to monitor progress of an executor automatically following the instruction.

The presently disclosed details in the recipe representation are shown in FIG. 1. In particular, FIG. 1 is a schematic representation of presently disclosed system architecture, representing both presently disclosed system subject matter and methodology. FIG. 2 is a chart relating to an exemplary embodiment of presently disclosed subject matter showing a summary of an exemplary recipe representation in set notation A. In particular, a recipe (R) requires a set of ingredients (IG) and is said to be complete upon performing a set of instructions (I). Each ingredient is a set consisting of the name, quantity (Q) required for the recipe, allergen information (A), alternative replacements for the ingredient, quality characteristic—which signifies the state of the ingredient (e.g., grated cheese or cheese slice are two different quality characteristics for cheese)—and image. Q is a tuple consisting of measuring and corresponding units. A captures the allergen information (ID) to index all possible allergens, categories of allergens to which the ingredient belongs, reference to the source from where this information is captured, and additional details for the allergen as present in the Knowledge Graph.

Each instruction is broken down into atomic actions. I is a tuple including the original recipe text from which the representation is being built; the input condition and output condition which define the requirements and changes that happen in the cooking environment once an instruction is performed; tasks (T) which capture the atomic actions; and modality (M) which has visual information regarding the instruction. The set T also contains information regarding the objects being used and the activity performed on them, the output quality of the action, and background knowledge BK. BK is 2-tuple, including tools and failures associated with the atomic action.

FIG. 3 is an illustration of an exemplary recipe in presently disclosed R3. Accompanying Appendix A forms part of this presently disclosed Specification, and lists an exemplary complete recipe for Egg Drop Chicken Noodle Soup. Appendix A illustrates a running chart with "Original Instruction" listings in the left-hand column, and the corresponding "Rich Recipe Representation (R3)" subject matter of the present disclosure in the right-hand column.

The following is an example Solution: Searching Recipes Based on R3-1.

Given the problem, the disclosure involves one or more methods using R3.
  Input:
    One or more of—(a) query terms (b) query images
    Constraints—one or more of—(a) outcome and (b) process
  Output:
    List with 0 or more of results, where
      A result has recipe and metadata
        Metadata is a score of how good it matched and explanation
  This disclosure provides a number of methods.
Method 1:
  a. search based on text features alone
  b. search on image features alone
  c. combine results The following is another exemplary Solution: Searching Recipes Based on R3-2.

Method 2:
  a. combine text and image into a common query representation
    i. Embodiment A: use R3
    ii. Embodiment B:
      1. Extract text features from image like annotation
      2. Combine all text features together for search
    iii. Embodiment C:
      1. Extract image features from text like pixel color
      2. Combine all image features together for search
  b. Search database.

Method 3:
  a. Perform Method 1 and Method 2
  b. Remove duplicates and combine
  Input:
    One or more of—(a) query terms (b) query images
    Constraints—one or more of (a) outcome and (b) process
  Output:
    List with 0 or more of results
      A result has recipe and metadata
        Metadata is a score of how good it matched and explanation The following is yet another exemplary Solution: Reasoning to Perform Constrained Information Retrieval using R3.

Constrained Information Retrieval (CIR) is concerned with obtaining specific information from the given data based on the restrictions mentioned by the user. R3 supports two types of CIR:

Output Constraint Queries
    "I want the recipe for a vegan omelet"
    No animal product should be in the ingredient
      "I want to cook an egg-based recipe that does not have any nut allergies"
    No ingredient should be an allergen and should consist of only an egg
  Process Constraint Queries
    "Give me a recipe which is not re-fried"
    Reason on action type; food in preparation should not be fried twice but separate ingredients can be
      "I want to cook something which only has boiled vegetables"
    Reason about action type used in recipe Solution: Monitoring Cooking Based on R3
  Current_instruction=start
  While current_instruction is before or at last_instruction
    For each action in current_instruction
    State=Execute action in current_instruction
    Observe(State)
    If (state==failure)
      Execute alternative_action
    Move to next instruction Other embodiments of the presently disclosed subject matter relate to systems and/or methods of finding recipes from a repository, including
  Giving query input as text, image or a combination;
  Maintaining information about recipes and ingredients in a unified representation of instructions;
  Recording each instruction in R3 representation with one or more atomic actions corresponding to an executable action along with its description in text and images, condition for successful execution, and pointer to a knowledge graph of external information; and
  Getting output as a text, image or a combination.

For some embodiments of the foregoing, the query has a constraint on outcome, such as:
  Where the outcome constraint is about allergens in ingredients and/or
  Where the outcome constraint is about the condition of the food prepared.

For some embodiments of the foregoing, the query has a constraint on process, such as:
  Where the process constraint is about the type of action and/or
  Where the constraint is about the order of actions.

Some presently disclosed embodiments relate to a system and/or method to monitor execution of recipes, including representing a recipe in R3 representation and tracking execution of each instruction and each atomic action based on its condition for success.

While certain embodiments of the disclosed subject matter have been described using specific terms, such description is for illustrative purposes only, and it is to be understood that changes and variations may be made without departing from the spirit or scope of the subject matter.

APPENDIX A

| Recipe: Egg Drop Chicken Noodle Soup | |
| --- | --- |
| Original Instruction | Rich Recipe Representation (R3) |
| Preparation Time: 10 minutes | "ingredients": [ |
| Cooking Time: 15 minutes | { |
| Serves: 5 | "name": "chicken broth", |
| 4 cups chicken broth | "quantity": { |
| 1 1/2 cups water | "measure": "4", |
| 3 tablespoons soy sauce | "unit": "cups" |
| 3 garlic cloves, smashed | }, |
| 1 1/2 teaspoons ground ginger | "allergies": { |
| 4 ounces wide rice noodles or | "id": "", |
| pad Thai noodles, broken into 3- | "category": "", |
| inch pieces | "ref": "", |
| 2 tablespoons cornstarch | "details": "" |
| 2 eggs, lightly beaten | }, |
| 1 1/2 cups cooked, shredded | "alternative": "", |
| chicken | "quality_characteristic": "", |
| 3 scallions, thinly sliced | "image": "./images/egg-drop-chicken-noodle- |
| (optional) | soup/ingredients/chicken-broth.jpeg" |
| | }, |
| | { |

-continued

| Recipe: Egg Drop Chicken Noodle Soup | |
|---|---|
| Original Instruction | Rich Recipe Representation (R3) |
| | ```
      "name": "water",
      "quantity": {
        "measure": "1.5",
        "unit": "cups"
      },
      "allergies": {
        "id": "",
        "category": "",
        "ref": "",
        "details": ""
      },
      "alternative": "",
      "quality_characteristic": "",
      "image": "./images/egg-drop-chicken-noodle-soup/ingredients/1-5cupwater.jpeg"
    },
    {
      "name": "soy sauce",
      "quantity": {
        "measure": "3",
        "unit": "tbsp"
      },
      "allergies": {
        "id": "",
        "category": "",
        "ref": "",
        "details": ""
      },
      "alternative": "",
      "quality_characteristic": "",
      "image": "./images/egg-drop-chicken-noodle-soup/ingredients/soysauce.jpeg"
    },
    {
      "name": "garlic cloves",
      "quantity": {
        "measure": "3",
        "unit": ""
      },
      "allergies": {
        "id": "",
        "category": "",
        "ref": "",
        "details": ""
      },
      "alternative": "",
      "quality_characteristic": "smashes",
      "image": "./images/egg-drop-chicken-noodle-soup/ingredients/smashgarlicclove.jpeg"
    },
    {
      "name": "ginger",
      "quantity": {
        "measure": "0.5",
        "unit": "teaspoon"
      "allergies": {
        "id": "",
        "category": "",
        "ref": "",
        "details": ""
      },
      "alternative": "",
      "quality_characteristic": "grounded",
      "image": "./images/egg-drop-chicken-noodle-soup/ingredients/groundedginger.jpeg"
    },
    {
      "name": "rice noodles",
      "quantity": {
        "measure": "4",
        "unit": "ounces"
      },
      "allergies": {
        "id": "",
        "category": "",
``` |

Recipe: Egg Drop Chicken Noodle Soup

| Original Instruction | Rich Recipe Representation (R3) |
|---|---|
| | ```
        "ref": "",
        "details": "
      },
      "alternative": "pad thai noodles",
      "quality_characteristic": "broken into 3-inch
pieces",
      "image": "./images/egg-drop-chicken-noodle-
soup/ingredients/Rice-Noodle-Rice-Vermicelli-Bun-Tuoi.jpg"
    },
    {
      "name": "cornstarch",
      "quantity": {
        "measure": "2",
        "unit": "tbsp"
      },
      "allergies": {
        "id": "",
        "category": "",
        "ref": "",
        "details": ""
      },
      "alternative": "",
      "quality_characteristic": "",
      "image": "./images/egg-drop-chicken-noodle-
soup/ingredients/cornstarch.jpeg"
    },
    {
      "name": "egg",
      "quantity": {
        "measure": "2",
        "unit": ""
      },
      "allergies": {
        "id": "",
        "category": "",
        "ref": "",
        "details": ""
      },
      "alternative": "",
      "quality_characteristic": "lightly beaten",
      "image": "./images/egg-drop-chicken-noodle-
soup/ingredients/lightlybeatenegg.jpeg"
    },
    {
      "name": "chicken",
      "quantity": {
        "measure": "1.5",
        "unit": "cups"
      "allergies": {
        "id": "",
        "category": "",
        "ref": "",
        "details": ""
      },
      "alternative": "",
      "quality_characteristic": "cooked, shredded",
      "image": "./images/egg-drop-chicken-noodle-
soup/ingredients/shreddedcookedchicken.jpg"
    },
    {
      "name": "scallions",
      "quantity": {
        "measure": "3",
        "unit": ""
      },
      "allergies": {
        "id": "",
        "category": "",
        "ref": "",
        "details": ""
      "alternative": "",
      "quality_characteristic": "thinly sliced, optional",
      "image": "./images/egg-drop-chicken-noodle-
soup/ingredients/thinlyslicedscallions.jpeg"
    }
``` |

-continued

| Recipe: Egg Drop Chicken Noodle Soup | |
|---|---|
| Original Instruction | Rich Recipe Representation (R3) |
| | ],<br>"prep_time": "10 minutes",<br>"cook_time": "15 minutes",<br>"serves": "5", |
| Step 1. Beat the egg well. Egg drop soup is noted for its strands of shredded egg. To achieve this characteristic look and texture, make sure you blend the egg mixture well and stir it slowly into the broth. | {<br>    "original_text": "Beat the egg well.Egg drop soup is noted for its strands of shredded egg. To achieve this characteristic look and texture, make sure you blend the egg mixture well, and stir it slowly into the broth.",<br>    "input_condition": ["have_egg", "have_chicken_broth"],<br>    "task": [<br>        {<br>            "action_name": "Beat the egg well",<br>            "output_quality": ["Make sure it is free from shredded egg strands.",<br>            "Egg mixture should be well blended."],<br>            "background_knowledge": {<br>                "tool": ["For beating egg"],<br>                "failure": ["Egg shell fell into the bowl"]<br>            }<br>        },<br>        {<br>            "action name": "Stir it into the chicken broth.",<br>            "output_quality": [ ],<br>            "background_knowledge": {<br>                "tool": [ ],<br>                "failure": ["Egg shell fell into the bowl"]<br>            }<br>        }<br>    ],<br>    "output_condition": ["have_egg_chicken_broth_mixture"],<br>    "modality": {<br>        "image": ["./images/egg-drop-chicken-noodle-soup/egg-drop-chicken-noodle-soup_2_0.jpg ","./images/egg-drop-chicken-noodle-soup/egg-drop-chicken-noodle-soup_2_1.jpg "],<br>        "video": " "<br>    }<br>}, |
| Step 2. Shred the chicken. | "original_text":"Shred the chicken",<br>    "input_condition": ["have_chicken"],<br>    "task": [<br>        {<br>            "action_name": "Shred the chicken",<br>            "output_quality": [ ],<br>            "background_knowledge": {<br>                "tool": ["Shredder tool needed"],<br>                "failure": ["Shredder not present"]<br>            }<br>        }<br>    ],<br>    "output_condition": ["have_shredded_chicken"],<br>    "modality": {<br>        "image": ["./images/egg-drop-chicken-noodle-soup/egg-drop-chicken-noodle-soup_3_0.jpg "],<br>        "video": " "<br>    }<br>}, |
| Meanwhile, stir together the cornstarch and 2 tablespoons water in a small bowl. Mix it well. Whisk into broth and cook for 1 minute or until thickened. | {<br>    "original_text":"Meanwhile, stir together the cornstarch and 2 tablespoons water in a small bowl. Mix it well. Whisk into broth and cook for 1 minute or until thickened.",<br>    "input_condition": ["have_cornstarch", "have_water", "have_cooked_broth_mixture", "have_bowl"],<br>    "task": [<br>        {<br>            "action_name": "Stir cornstarch and 2 tbsp water.",<br>            "output_quality": ["Use a whisker to mix well."], |

Recipe: Egg Drop Chicken Noodle Soup

| Original Instruction | Rich Recipe Representation (R3) |
|---|---|
| | ```
                "background_knowledge": {
                    "tool": [ ],
                    "failure": ["cornstart is not mixed well",
"overused cornstarch"]
                }
            },
            {
                "action_name": "Cook this mixture for 1 minute",
                "output_quality": ["Or until thickened."],
                "background_knowledge": {
                    "tool": ["mixing bowl", "whisker"],
                    "failure": ["overcooked broth"]
                }
            }
        ],
        "output_condition": ["have_broth_with_cornstarch"],
        "modality": {
            "image": ["./images/egg-drop-chicken-noodle-soup/egg-drop-chicken-noodle-soup_5_0.jpg ","./images/egg-drop-chicken-noodle-soup/egg-drop-chicken-noodle-soup_5_1.jpg "],
            "video": " "
        }
    },
``` |
| Step 3. Remove the garlic cloves with a slotted spoon. Add noodles to pot and cook for 4 minutes until the noodles are cooked. | ```
    {
        "original_text":"Remove the garlic cloves with a slotted spoon. Now add noodles to pot. Cook for 4 minutes till the noodles are cooked.",
        "input_condition": ["have_broth_with_cornstarch", "have_noodles", "have_pot"],
        "task": [
            {
                "action_name": "Remove garlic cloves from the broth",
                "output_quality": ["Use a slotted spoon to do it efficiently."],
                "background_knowledge": {
                    "tool": ["Slotted Spoon"],
                    "failure": [ ]
                }
            },
            {
                "action_name": "Boil noodles in a pot",
                "output_quality": ["Cook for 4 minutes."],
                "background_knowledge": {
                    "tool": ["Pot"],
                    "failure": ["overcooked noodles"]
                }
            }
        ],
        "output_condition": ["have_boiled_noodles", "have_cooked_broth_mixture_without_garlic"],
        "modality": {
            "image": ["./images/egg-drop-chicken-noodle-soup/egg-drop-chicken-noodle-soup_6_0.jpg "],
            "video": " "
        }
    },
``` |
| Step 4. Stir the soup so it is moving in a circular direction. Drizzle beaten egg into hot broth, stirring constantly. | ```
    {
        "original_text":"Stir the soup so it is moving in a circular direction. Drizzle beaten egg into hot broth, stirring constantly.",
        "input_condition": ["have_boiled_noodles", "have_cooked_broth_mixture without_garlic", "have_raw_egg"],
        "task": [
            {
                "action_name": "Add noodles to the broth.",
                "output_quality": ["Stir the soup."],
                "background_knowledge": {
                    "tool": [ ],
                    "failure": [ ]
                }
``` |

| Recipe: Egg Drop Chicken Noodle Soup | |
|---|---|
| Original Instruction | Rich Recipe Representation (R3) |
| | },<br>{<br>    "action_name": "Beat a raw egg into the broth",<br>    "output_quality": ["Keep stirring constantly."],<br>    "background_knowledge": {<br>        "tool": [ ],<br>        "failure": ["did not stir well", "egg coagulated"]<br>    }<br>}<br>],<br>"output_condition": ["have_egg_chicken_noodle_soup"],<br>"modality": {<br>    "image": ["./images/egg-drop-chicken-noodle-soup/egg-drop-chicken-noodle-soup_7_0.jpg ", "./images/egg-drop-chicken-noodle-soup/egg-drop-chicken-noodle-soup_7_1.jpg"],<br>    "video": " "<br>}<br>}, |
| Step 5. Remove from the heat; stir in onion and chicken. Serve hot. | {<br>    "original_text":"Remove from the heat; stir in onion and chicken. Serve it hot.",<br>    "input_condition": ["have_egg_chicken_noodle_soup", "have_onion", "have_chicken"],<br>    "task": [<br>        {<br>            "action_name": "Remove from the heat.",<br>            "output_quality": [ ],<br>            "background_knowledge": {<br>                "tool": [ ],<br>                "failure": ["Overcooked", "Burnt"]<br>            }<br>        },<br>        {<br>            "action name": "Stir in onion and chicken.",<br>            "output_quality": ["Serve hot."],<br>            "background_knowledge": {<br>                "tool": [ ],<br>                "failure": ["Onion missing"]<br>            }<br>        }<br>    ],<br>    "output_condition": ["recipe_complete"],<br>    "modality": {<br>        "image": ["./images/egg-drop-chicken-noodle-soup/egg-drop-chicken-noodle-soup_8_0.jpg ", "./images/egg-drop-chicken-noodle-soup/egg-drop-chicken-noodle-soup_8_1.jpg","./images/egg-drop-chicken-noodle-soup/egg-drop-chicken-noodle-soup_8_2.jpg "],<br>        "video": " "<br>    }<br>} |

What is claimed is:

1. Methodology for multimodal recipe retrieval and execution monitoring, comprising:

providing a user interface;

maintaining a database comprising a knowledge graph of external information viewable by a user via the user interface;

maintaining a searchable repository of rich recipe representations, each of which comprise a recipe and associated ingredients in a unified representation of instructions, with each instruction recorded in rich recipe representation with one or more atomic actions corresponding to an executable action, along with its description in text and images, condition for successful execution, and pointer to pertinent data in the knowledge graph of external information;

making a recipe query input by the user via the user interface to the searchable repository in the form of text, image or a combination thereof;

notifying the user via the user interface of recipe query output obtained from the searchable repository in the form of text, image or a combination thereof;

executing the recipe instructions; and monitoring execution of the recipe atomic actions as established by the corresponding conditions retrieved from the recipe query;

wherein the knowledge graph of external information includes information about possible failures and solutions for each atomic action; and the methodology further comprises notifying the user via the user interface whenever monitoring execution of the recipe atomic actions indicates occurrence of a failure condition for a specific atomic action, and comprises providing the user possible solutions via the external information via the user interface.

2. Methodology in accordance with claim 1, wherein:
the knowledge graph of external information includes at least one of information about allergens in ingredients and about condition of food prepared; and
the recipe query input includes a constraint on outcome corresponding with at least information in the knowledge graph of external information.

3. Methodology in accordance with claim 1, wherein the recipe query input includes a constraint on outcome corresponding with at least the type and the order of actions according to instructions for a recipe.

4. Methodology in accordance with claim 1, wherein the unified representation of instructions for rich recipe representations (R3) comprises a machine processable JavaScript Object Notation (JSON) representation which comprises an open standard, human-readable text-based format for representing structured data.

5. Methodology in accordance with claim 1, further comprising using a web-based user interface for use in conducting a recipe query input to the searchable repository.

6. Methodology in accordance with claim 1, wherein the recipe query input is one of a constrained query and an expressive query.

7. Methodology in accordance with claim 1, wherein the knowledge graph of external information includes information about allergen information.

8. Methodology for multimodal retrieval and execution monitoring for a workflow for a user accomplishing a task, comprising:
providing a user interface;
maintaining a database comprising a knowledge graph of external information viewable by a user via the user interface;
maintaining a searchable repository of rich workflow representations, each of which comprise a workflow and associated materials in a unified representation of instructions, with each instruction recorded in rich workflow representation with one or more atomic actions corresponding to an executable action, along with its description in text and images, condition for successful execution, and pointer to pertinent data in the knowledge graph of external information;
making a workflow query input by the user via the user interface to the searchable repository in the form of text, image or a combination thereof;
notifying the user via the user interface of workflow query output obtained from the searchable repository in the form of text, image or a combination thereof;
executing the workflow instructions; and
monitoring execution of the workflow atomic actions as established by the corresponding conditions retrieved from the workflow query;
wherein the knowledge graph of external information includes information about possible failures and solutions for each atomic action; and
the methodology further comprises notifying the user via the user interface whenever monitoring execution of the workflow atomic actions indicates occurrence of a failure condition for a specific atomic action, and comprises providing the user possible solutions via the external information via the user interface.

9. Methodology in accordance with claim 8, wherein the workflow for a user accomplishing a task includes at least one of a recipe for preparing food, a set of instructions for assembling a product, and a set of instructions for performing complex activities.

10. Methodology in accordance with claim 8, wherein:
the knowledge graph of external information includes at least one of information about materials; and
the workflow query input includes a constraint on outcome corresponding with at least information in the knowledge graph of external information.

11. Methodology in accordance with claim 8, wherein the workflow query input includes a constraint on outcome corresponding with at least the type and the order of actions according to instructions for a workflow.

12. Methodology in accordance with claim 8, wherein the unified representation of instructions for rich workflow representations comprises a machine processable JavaScript Object Notation (JSON) representation which comprises an open standard, human-readable text-based format for representing structured data.

13. Methodology in accordance with claim 8, further comprising using a web-based user interface for conducting a workflow query input to the searchable repository.

14. Methodology in accordance with claim 8, wherein the workflow query input is a constrained query.

15. Methodology in accordance with claim 8, wherein the knowledge graph of external information includes information about materials for each atomic action.

16. A system for multimodal recipe retrieval and execution monitoring, comprising:
a user interface;
a database comprising a knowledge graph of external information viewable by a user via the user interface and including information about possible failures and solutions for each atomic action;
a searchable repository of rich recipe representations, each of which comprise a recipe and associated ingredients in a unified representation of instructions, with each instruction recorded in rich recipe representation with one or more atomic actions corresponding to an executable action, along with its description in text and images, condition for successful execution, and pointer to pertinent data in the knowledge graph of external information; and
one or more processors programmed for
making a recipe query input by the user via the user interface to the searchable repository in the form of text, image or a combination thereof;
notifying the user via the user interface of recipe query output obtained from the searchable repository in the form of text, image or a combination thereof;
monitoring execution of the recipe atomic actions by a user as established by the corresponding conditions retrieved from the recipe query; and
notifying the user via the user interface whenever monitoring execution of the recipe atomic actions indicates occurrence of a failure condition for a specific atomic action, and providing the user possible solutions via the external information via the user interface.

17. A system in accordance with claim 16, wherein:
the knowledge graph of external information includes at least one of information about allergens in ingredients and about condition of food prepared; and the recipe query input includes a constraint on outcome corresponding with at least information in the knowledge graph of external information.

18. A system in accordance with claim 16, wherein the recipe query input includes a constraint on outcome corresponding with at least the type of action to be taken when following instructions for a recipe, and the order of actions to be taken when following instructions for a recipe.

19. A system in accordance with claim 16, wherein the unified representation of instructions for rich recipe representations (R3) comprises a machine processable JavaScript Object Notation (JSON) representation which comprises an open standard, human-readable text-based format for representing structured data.

20. A system in accordance with claim 16, further comprising using a web-based user interface for use in conducting a recipe query input to the searchable repository.

21. A system in accordance with claim 16, wherein the recipe query input is one of a constrained query and an expressive query.

22. A system in accordance with claim 16, wherein the knowledge graph of external information includes information about allergen information.

23. A system in accordance with claim 16, wherein said database and said searchable repository each comprise one or more network-based non-transitory storage devices.

24. A system in accordance with claim 23, wherein said one or more processors are further programmed for periodically updating at least one of said database and said searchable repository.

25. A system in accordance with claim 24, wherein said one or more processors further comprise an AI-based system using analytical/optimization techniques.

26. A system in accordance with claim 16, wherein said system comprises one of a web-based application and a stand-alone application running on a personal computer.

* * * * *